United States Patent [19]

Wilken et al.

[11] 4,378,089
[45] Mar. 29, 1983

[54] SURFACE IRRIGATION APPARATUS

[75] Inventors: John D. Wilken, Warlingham, England; Martin E. Parkes, Edinburgh, Scotland; Graham G. Curtis, Tenterden; David W. Shepherd, Darenth, both of England

[73] Assignee: Tate & Lyle Limited, England

[21] Appl. No.: 237,644

[22] Filed: Feb. 24, 1981

[30] Foreign Application Priority Data

Mar. 4, 1980 [GB] United Kingdom ............... 8007302

[51] Int. Cl.³ ............................................. A01G 25/09
[52] U.S. Cl. ........................................ 239/70; 239/179; 239/711
[58] Field of Search ............................. 239/179–181, 239/184, 711, 70, 191–192

[56] References Cited

U.S. PATENT DOCUMENTS

| | | | |
|---|---|---|---|
| 2,628,863 | 2/1953 | Maggart | 239/179 |
| 2,718,433 | 9/1955 | Poynor | 239/179 |
| 2,918,800 | 12/1959 | Ford | 239/179 |
| 3,104,821 | 9/1963 | Anderson | 239/179 |
| 3,303,655 | 2/1967 | Loomis | 239/181 |
| 4,222,520 | 9/1980 | Melcher | 239/179 |

Primary Examiner—John J. Love
Assistant Examiner—Michael J. Forman
Attorney, Agent, or Firm—Ostrolenk, Faber, Gerb & Soffen

[57] ABSTRACT

Surface irrigation apparatus comprises a carriage movable along an irrigation canal. A dam is supported by the carriage in such a way that water flowing along the canal is incident upon the dam and is checked thereby and the carriage is pushed along the canal in the direction of flow. The carriage is provided with means for arresting its movement at desired positions along the canal. Preferably, the arresting means comprises on the carriage one or more arms which are releaseably engageable with stops on the canal although the arresting means could take the form of one or more brakes operated in accordance with the position of the carriage. The carriage also has means, such as syphon tubes, for transferring water from the canal to land to be irrigated.

17 Claims, 7 Drawing Figures

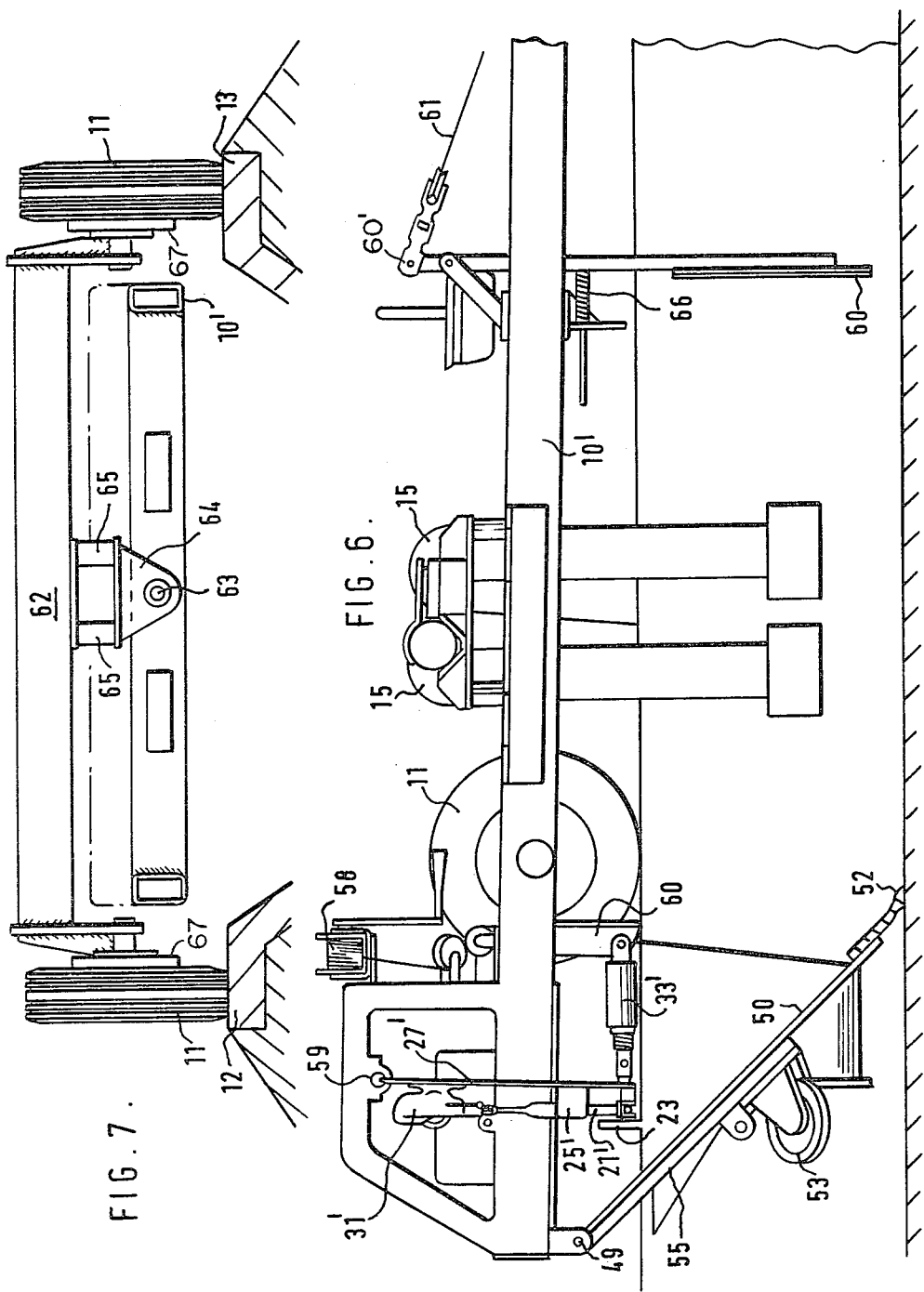

SURFACE IRRIGATION APPARATUS

This invention relates to surface irrigation apparatus.

The invention provides surface irrigation apparatus comprising a carriage movable along an irrigational canal, a dam supported by the carriage in such a way that in use water flowing along the canal is incident upon the dam and is checked thereby and the carriage is thus pushed along the canal in the direction of flow, means for arresting movement of the carriage at desired positions along the canal, and means supported by the carriage for transferring water from the canal to land to be irrigated.

Preferably, the carriage arresting means comprises at least one, and desirably two arms, releasably engageable with stops mounted along the canal.

Preferably, the or each arm is reciprocatable by power operated means which may comprise a battery driven reciprocating electric motor associated with each arm.

Advantageously, the or each arm is reciprocatable in the direction of its longitudinal axis in a guide mounted on a support which is connected to the carriage for pivotal movement and an energy storage device is connected to the or each arm. Preferably, the dam is provided with an edge seal releasably engageable with the wall of the canal. In this case, the seal may be movable relative to the dam between a first position in which the seal, in use, engages the wall of the canal and a second position in which, in use, the seal is disengaged from the wall of the canal. The edge seal may be connected to the or each support such that when the or each arm is reciprocated in use, to disengage it from a respective stop, the or each energy storage device pivots the respective support to thereby cause the or each support to pivot hence to move the seal to its second position relative to the dam where it is retained until movement of the carriage is again arrested.

Conveniently, the dam is connected to the carriage at its upper end for pivotal movement about a horizontal axis and means are provided for pivoting the dam and for supporting the dam in any one of a plurality of angularly spaced positions. The dam can thus be raised when it is desired to reverse the carriage.

Preferably, the carriage is provided with ground (or canal) engaging wheels for supporting the carriage for movement along the canal.

Normally, the carriage will have a front and a rear axle and in this case, it is advantageous for the rear axle to be connected to the carriage for pivotal movement about an axis parallel to the longitudinal extent of the carriage so that the carriage will adjust itself to suit different landslopes. The carriage may also be provided with guide means which guide the carriage along the canal.

Advantageously, at least one of the ground engageable wheels has a friction brake associated therewith. In this case, a paddle may be supported by the carriage so as to extend in use into the water behind the dam, the paddle being pivotable upon movement of the carriage to apply the friction brake to control the speed of movement of the carriage.

Preferably, the carriage carries means for controlling the residence time of the carriage at each stationary position. The control means may be preprogrammed so that the carriage will move along the canal according to a predetermined schedule.

Preferably, the water transferring means comprises one or more syphon tubes.

Preferably, the apparatus is used in conjunction with a control gate locatable upstream of the carriage for controlling the rate of flow of water along the canal.

Preferably, the dam has one or more openings therein to allow water to flow beyond the dam. The or each opening may be provided with a closure member.

The invention will now be more particularly described with reference to the accompanying drawings, wherein:

FIG. 6 is a section along line VI—VI of FIG. 5, and FIG. 7 is in transverse section showing the rear axle mounting of the apparatus shown in FIGS. 5 and 6.

Figure 1:
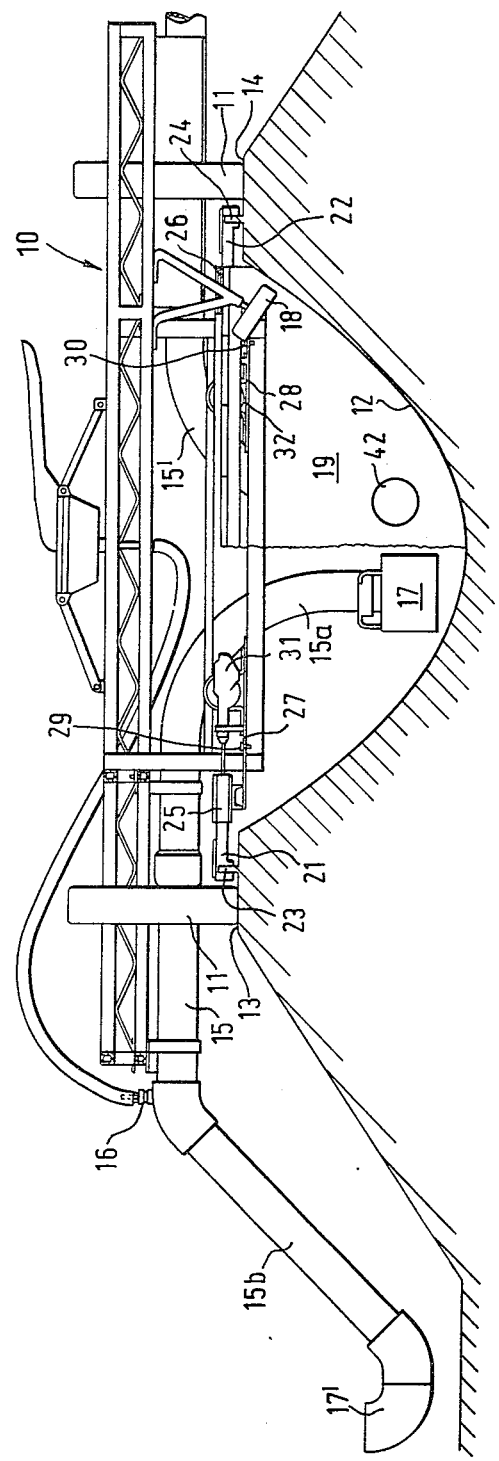
FIG. 1 is an end view of one embodiment of surface irrigation apparatus according to the invention, with parts removed for reasons of clarity.
Figure 2:
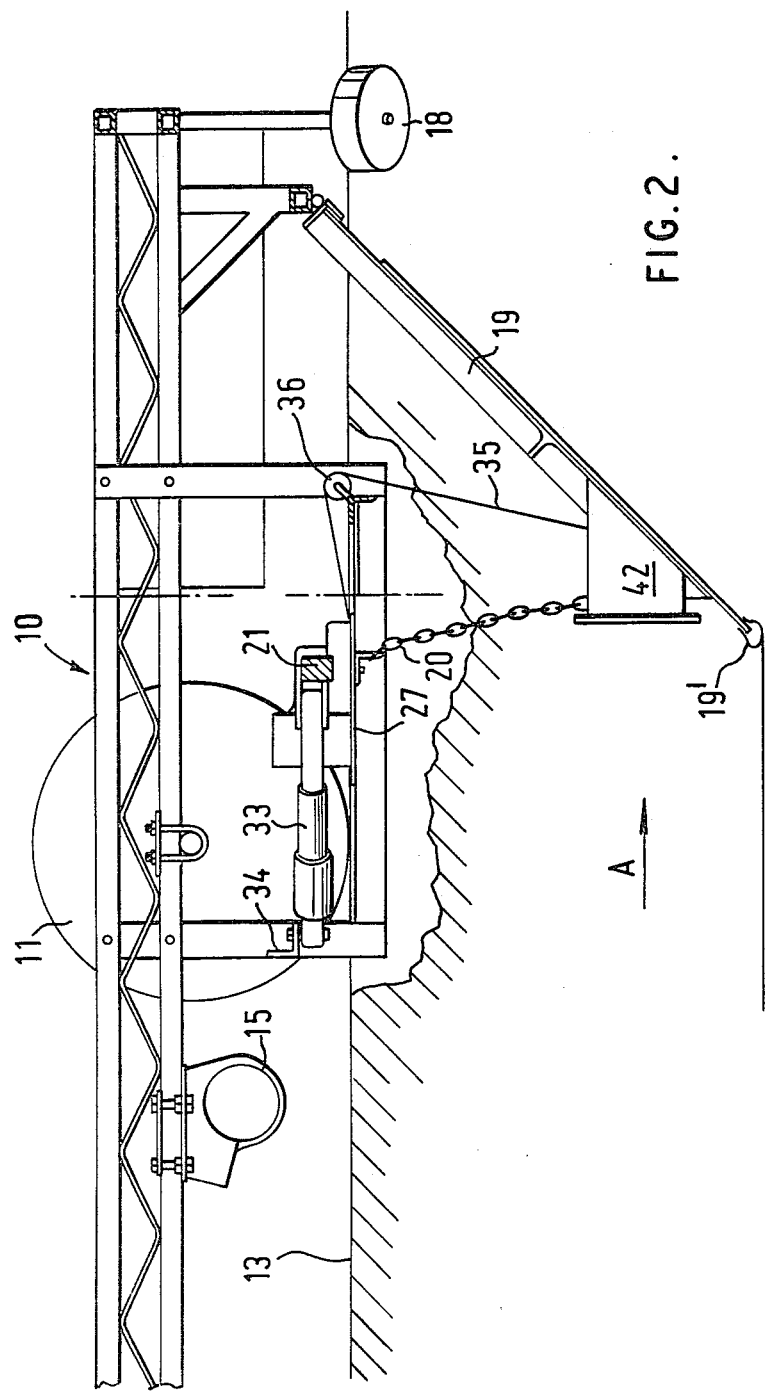
FIG. 2 is a side view of the forward end of the apparatus of FIG. 1, partly in section.
Figure 3:
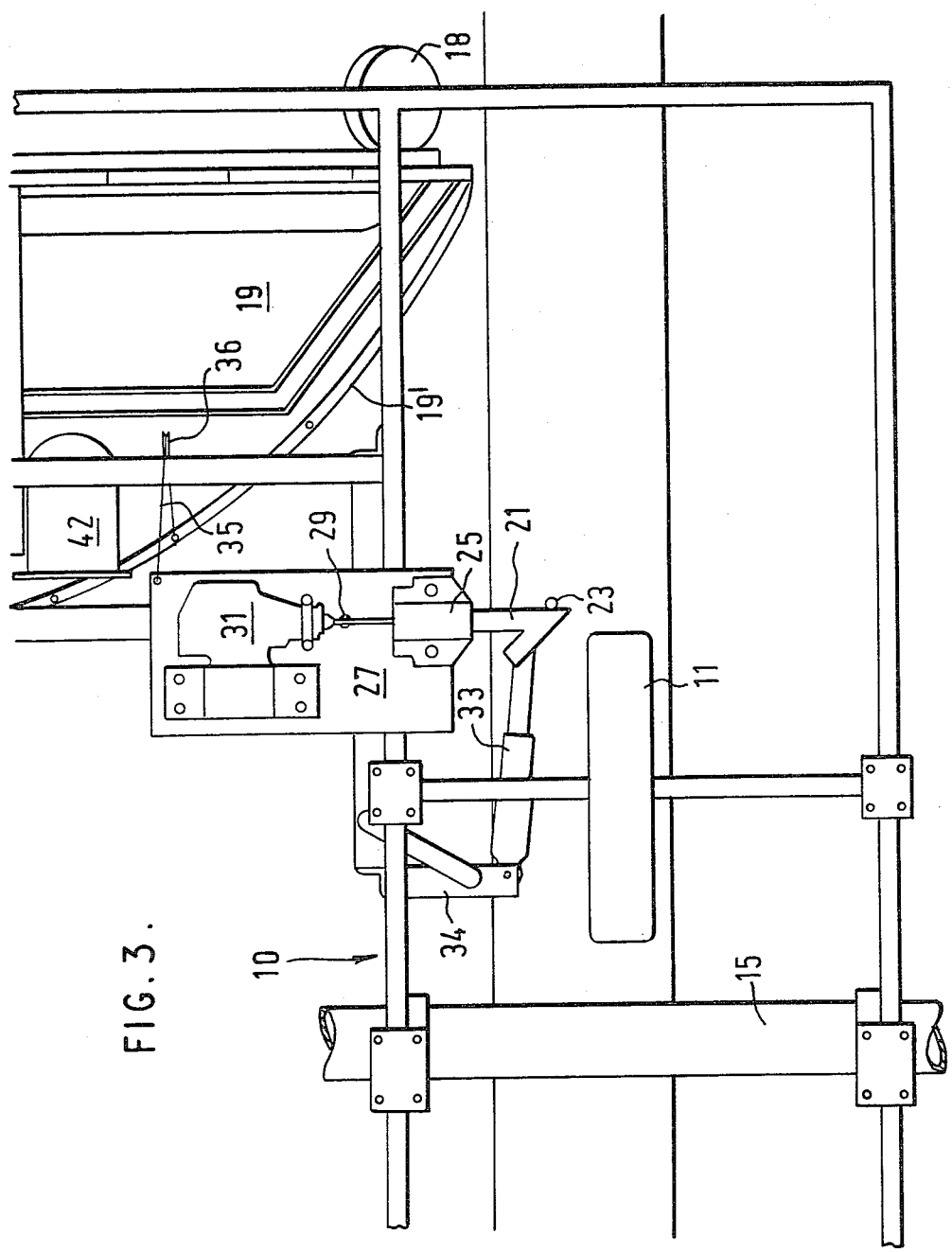
FIG. 3 is a plan view of one side of the forward end of the apparatus shown in FIG. 1.

Referring to FIGS. 1-4 of the drawings, the surface irrigation apparatus shown therein comprises a carriage having a chassis 10 and wheels 11. The carriage is constructed and arranged so as to bridge a concrete lined, minor irrigation canal 12 with the wheels on opposite sides of the carriage respectively engaging flat tracks 13 and 14 running along opposite sides of the canal.

The carriage is provided with a first group of three syphon tubes 15 (only one shown) for transferring water from the canal to land to be irrigated on one side of the canal and a second group of three syphons 15' (only one shown) for transferring water from the canal to land to be irrigated on the other side of the canal. Each syphon tube 15, 15' is of generally inverted U-shaped configuration having a priming valve 16 at the upper end. One of the limbs 15a of the syphon is arranged so as to project into water in the canal and the other limb 15b of the syphon terminates adjacent land to be irrigated. A cup 17 is connected to the limb 15a adjacent to the free end thereof and a U-shaped tubular end piece 17' is coupled to the free end of the limb 15b so that air cannot enter the syphon tube if and when the water level in the canal recedes. Thus, the syphon tube is maintained in a primed condition.

At each end, the carriage supports two guide wheels 18 which engage the wall of the canal adjacent opposite edges thereof respectively to guide the carriage in movement along the canal.

A dam 19 is pivotably connected to the forward end of the carriage and is provided with an edge seal 19'. The seal 19' is movable relative to the dam by means which will be described later between a first or lower position in which the seal engages the wall of the canal to prevent water in the canal flowing past the dam and a second or upper position in which the seal is disengaged from the wall of the canal. The lower edge of the dam 19 is connected to the carriage by a flexible elongate element such as a chain 20 to permit prior to use adjustment of the initial position of the dam relative to the carriage to allow the edge seal 19' to engage the wall of the canal when in its first or lower position, but to support some of the weight of the dam to prevent excessive pressure between the seal and the canal wall.

The carriage 10 is provided with arresting means comprising two stop arms 21, 22 which extend in opposite lateral directions and which are releasably engageable with stops 23, 24 respectively distributed at predetermined intervals along the tracks 13, 14. Each arm 21, 22 is supported for reciprocatable movement in the direction of its longitudinal extent in a respective slide block 25, 26. Each block 25, 26 is mounted on a plate 27, 28 which is connected to a respective side of the carriage by a bolt 29, 30 each for pivotal movement about a vertical axis. Each arm 21, 22 is connected at its inner end to a respective reciprocating electric motor 31, 32 powered by a battery which is mounted on the carriage and which may be trickle charged by a water turbine (not shown) or a solar energy converter.

Each arm 21, 22 is connected adjacent its outer end to one end of an energy storage device in the form of a shock absorber (only one shown at 33), e.g. by a pin joint, to allow relative pivotal movement of the arm and its respective shock absorber about a vertical axis. Each shock absorber extends rearwardly from its respective arm and is connected at its other end to a cantilever beam (only one shown at 34), e.g. by another pin joint, to allow pivotal movement of the shock absorber relative to its respective beam 34. The cantilever beams 34 are rigidly attached to the carriage. When the carriage is arrested by engagement between the arms 21 and 22 and respective stops 23 and 24, the shock absorbers 33 are compressed and they are retained in a state of partial compression by the water which flows along the canal in the direction of arrow A and which is incident upon the dam 19 and is checked thereby.

A flexible elongate element such as a cable 35 is attached to the seal 19' and to the inner ends of both plates 27 and 28 via respective pulley wheels (only one shown at 36) mounted on the carriage. When the carriage is stationery and the shock absorbers 33 are partially compressed as aforesaid, the cable 35 is sufficiently slack to allow the seal to adopt its first or lower position to engage the wall of the canal. However, when the arms 21, 22 are retracted by the motors 31, 32 respectively hence to disengage from a respective stop 23, 24, the shock absorbers 33 release their stored energy to pivot the plates 27, 28 in opposite directions which will result in the cable 35 raising the edge seal 19' to its second or upper position. The carriage 11 will then be pushed along the canal in the direction of arrow A under the influence of water pressure behind the gate 19. The arms 21 and 22 having been returned by their respective motors 31 and 32 to stop engageable positions, will then engage the next downstream stops to again arrest movement of the carriage.

When the movement of the carriage 10 is arrested the water held back by the dam 19 and edge seal 19' is distributed onto the land alongside the carriage by the syphon tubes 15. The rate of flow of water along the canal is controlled by a control gate located at a fixed position upstream of the carriage.

The dam 19 may be provided with one or more bypass openings 42 to allow water to flow beyond the dam particularly when more than one carriage is operating along the canal. The openings may be closed or partly closed by a closure member.

A control circuit (FIG. 4) is provided for operating the reciprocating motors 31 and 32 such that the residence time of the carriage 10 at each location is controlled according to a preset program. The control circuit comprises an interchangeable programmed module 37 connected to the input of a temporary store 38. A comparator 39 is provided and the temporary store is connected to one input of the comparator whilst a variable frequency clock pulse generator 40 is connected to the other input of the store 38. The output of the comparator is connected to a switching circuit 41 for energizing the motors 31 and 32 such that the latter complete at least one stroke to disengage the stop arms from respective stops.

The residence time of the carriage at each location will be a function of the depth of water compatible with efficient irrigation.

The clock pulse generator 40 is of variable frequency to permit variation of the residence time in accordance with, for example, prevailing weather conditions.

Several warning devices (not shown) may also be provided and these could be connected to a radio transmitter carried by the carriage for transmitting coded information to a central control station and/or to the upstream control gate which would, for instance, be closed automatically in the event of specified malfunctions of the apparatus. By way of example, such warning devices may detect (1) a malfunction of the control circuit such as if this fails to reactivate within a predetermined time interval,
(2) the water level behind the gate such as by a capitance sensor,
(3) battery condition.

Instead of the stop arms and stops along the canal, the movement of the carriage could be arrested by dropping the edge seal 19' to act as a brake or by providing brakes on at least some of the wheels. Such kinds of braking could be effected in response to coded information contained for instance on a magnetic tape and carried by the carriage or in response to proximity switches on the carriage detecting the presence of metal strips at selected locations on the side of the canal or in response to an optical sensor which counts a predetermined number of furrows between each stationary position on furrowed land.

The edge seal 19' could be fixed relative to the dam 19 and the dam instead of the edge seal could be pivoted into and out of engagement with the wall of the canal.

Indeed, it may not be necessary to move either the dam or the seal.

Finally, the syphon tubes could be of the type described in Australian Patent Specification No. 467,086.

Figure 5:
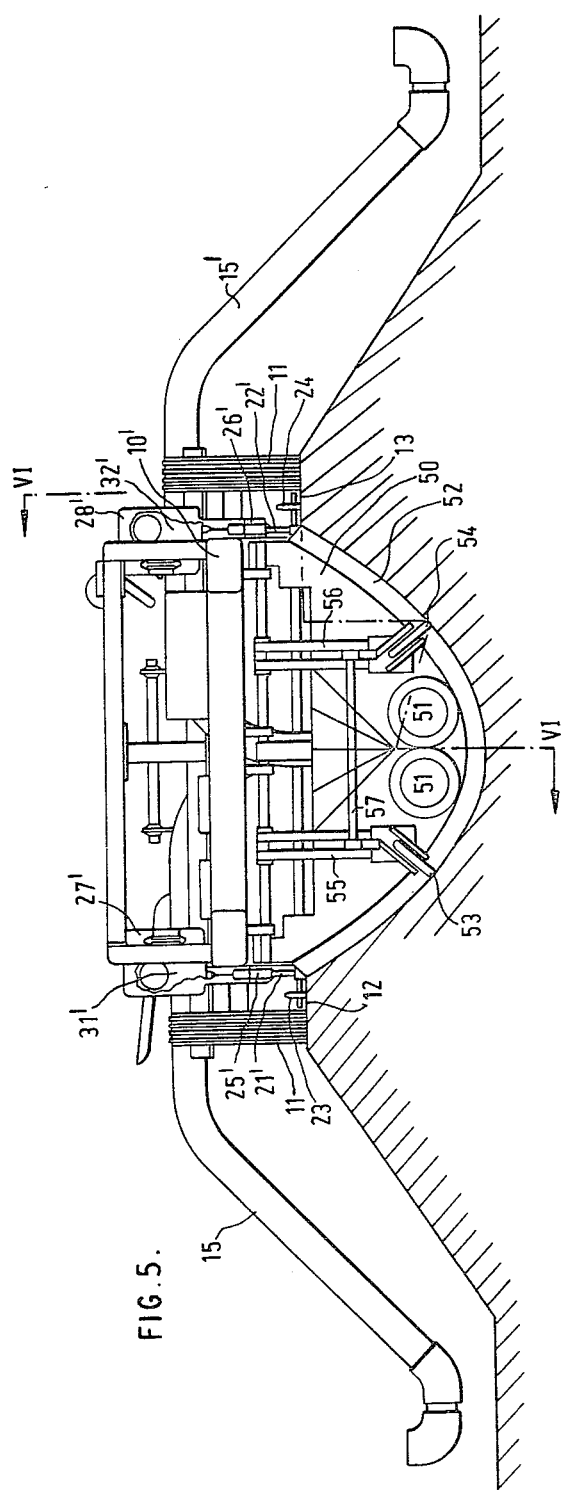
FIG. 5 is a front end view of a further embodiment of surface irrigation apparatus according to the invention.

Referring now to FIGS. 5–7 of the drawings, the surface irrigation apparatus shown therein comprises a carriage having a chassis 10', wheels 11 supported on front and rear axles and syphon tubes 15 and 15'. A dam 50 having bypass openings 51 is connected at its upper end to the forward end of the carriage for pivotal movement about a horizontal axis 49. The dam 50 has an edge seal 52 fixed thereto. At the forward end of the carriage, two guide wheels 53 and 54 are rotably carried by the lower ends of two supports 55 and 56 respectively connected together by a transverse brace 57 and depending from the carriage. The upper ends of the supports 55 and 56 are connected to the carriage for pivotable movement about the horizontal axis 49. The guide wheels 53 and 54 engage the canal wall and the dam 50 is urged against the supports 55 and 56 by water in the canal and behind the dam. Thus, the supports will take much of the weight of the dam 50 and prevent excess frictional forces between the edge seal 52 and the canal wall whilst adjusting the angular position of the dam 50 if the cross-sectional shape of the canal varies to at least assist in maintaining contact between the edge seal 52 and the canal wall.

Further guide wheels (not shown) may be mounted at the rear end of the carriage.

A winch 58 is provided for raising the dam 50 rearwardly and for supporting the dam in a desired angular position. This is particularly advantageous when it is desired to return the carriage to an upstream position.

The arresting means comprises vertically extending stops arms 21' and 22' each having a transverse member at its lower end releasably engageable with respective stops 23, 24. Each arm 21', 22' is connected at its upper end to a respective reciprocating motor 31', 32' and is guided for reciprocatable movement in the direction of its longitudinal extent in a respective slide block 25', 26'. The blocks 25' 26' and motors 31' 32' are mounted on respective vertical plates 27' 28'. Each plate 27' 28' is connected at its upper end for pivotal movement about a horizontal axis 59. The free end of each arm 21', 22' is connected to the forward end of a hydraulic deceleration unit (only one shown at 33') by a pin joint. The rear end of each unit 33' is connected by a further pin joint to a respective depending lug 60 rigidly attached to the carriage. When the carriage is arrested by engagement between the arms 21' and 22' and respective stops 23 and 24, the units 33' simply act to protect the arms 21' and 22'.

The rear wheels each have a mechanically-operated brake shoe (67, FIG. 7) associated therewith. When motion of the carriage begins, a brake paddle 60 which extends into the canal, is pivoted rearwardly at pivot 60' against the action of a spring 66 by water trapped between the dam and the paddle and this partially applies the brake shoes via a cable 61 to limit the speed of movement of the carriage along the canal.

The rear axle, shown in FIG. 7 and designated reference numeral 62, is attached to a bracket 64 which is connected to the carriage for pivotal movement about an axis 63 parallel to the longitudinal extent of the carriage. Spacers 65 are interposed between the axle 62 and the bracket 64 and these may be interchanged for other spacers of different lengths to arrange that the chassis of the carriage is parallel to the water surface regardless of the slope of the canal.

The vertical position of the syphon tubes may be adjustable to control the head of water operating thereon.

Figure 4:
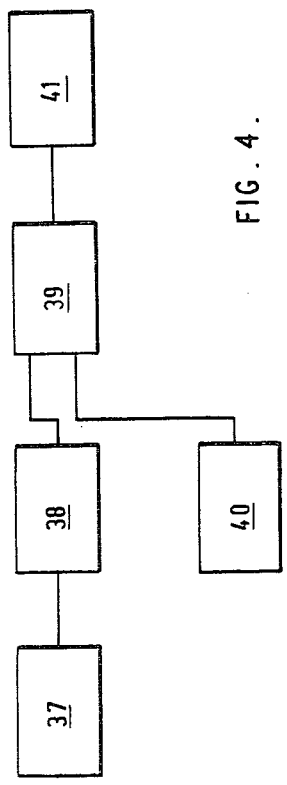
FIG. 4 is a block diagram of a control circuit for the reciprocating motor of FIGS. 1-3.

The carriage shown in FIGS. 5-7 is also provided with the control circuit shown in FIG. 4.

We claim:

1. Surface irrigation apparatus comprising a carriage movable along an irrigation canal, a dam supported by the carriage and extending toward the canal in such a way that in use water flowing along the canal is incident upon the dam and is checked thereby, the sole means of moving the carriage along the canal in the direction of flow being the force of the water against the dam, means for arresting movement of the carriage at desired positions along the canal carried by the carriage comprising two arms supported by the carriage in such a way as to be releasably engageable with stops mounted along opposite sides of the canal respectively, means for controlling the residence time of the carriage at each stationary position carried by the carriage, means for releasing the arresting means in response to the control means, and means supported by the carriage for transferring water from the canal to land to be irrigated.

2. The apparatus of claim 1, having power operated means for reciprocating each arm.

3. The apparatus of claim 2, wherein the power operated means comprises a reciprocating electric motor associated with each arm.

4. The apparatus of claim 2, further comprising a support associated with each arm, means connecting each support to the carriage for pivotal movement, a guide mounted on each support, means for reciprocating each arm in its respective guide in the direction of its longitudinal extent, and an energy storage device connected to each arm.

5. The apparatus of claim 4, wherein the dam is provided with an edge seal movable relative to the dam between a first position in which the seal, in use, engages the wall of the canal and a second position in which, in use, the seal is disengaged from the canal, and means connecting the edge seal to each support such that when each arm is reciprocated in use, to disengage it from a respective stop, each energy storage device pivots the respective support to thereby cause each support to pivot hence to move the seal to its second position relative to the dam where it is retained until movement of the carriage is again arrested.

6. The apparatus of claim 1, wherein the dam is provided with an edge seal releasably engageable with the wall of the canal.

7. The apparatus of claim 6, further comprising means for moving the seal relative to the dam between a first position in which the seal, in use, engages the wall of the canal and a second position in which, in use, the seal is disengaged from the wall of the canal.

8. The apparatus of claim 1, further comprising means connecting the upper end of the dam to the carriage for pivotal movement about a horizontal axis and means for pivoting the dam and for supporting the dam in any one of a plurality of angularly spaced positions.

9. The apparatus of claim 1, wherein the carriage is provided with canal engaging wheels for supporting the carriage for movement along the canal.

10. The apparatus of claim 9, wherein the carriage has a front and a rear axle, and means for connecting the rear axle to the carriage for pivotal movement about an axis parallel to the longitudinal extent of the carriage.

11. The apparatus of claim 9, wherein at least one of the ground engageable wheels has a friction brake associated therewith.

12. The apparatus of claim 11, wherein a paddle is supported by the carriage extending toward the canal so as to extend in use into the water behind the dam, and means to permit pivoting the paddle upon movement of the carriage to apply the friction brake to control the speed of movement of the carriage.

13. The apparatus of claim 1, wherein the carriage is provided with guide means for guiding the carriage along the canal.

14. The apparatus of claim 1, wherein the water transferring means comprises at least one syphon tube.

15. The apparatus of claim 1, in combination with a control gate locatable upstream of the carriage for controlling the rate of flow of water from the canal.

16. The apparatus of claim 1, wherein the dam has at least one opening therein to allow water to flow beyond the dam.

17. The apparatus of claim 16, wherein at least one opening is provided with a closure member.

* * * * *